United States Patent
Geiser

(10) Patent No.: US 9,409,244 B2
(45) Date of Patent: Aug. 9, 2016

(54) MACHINING METHOD FOR HARD-FINE MACHINING OF NOISE-OPTIMIZED GEARS ON A GEAR-CUTTING MACHINE

(71) Applicant: Liebherr-Verzahntechnik GmbH, Kempten (DE)

(72) Inventor: Hansjörg Geiser, Wiggensbach (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 158 days.

(21) Appl. No.: 14/195,985

(22) Filed: Mar. 4, 2014

(65) Prior Publication Data
US 2014/0256223 A1 Sep. 11, 2014

(30) Foreign Application Priority Data
Mar. 5, 2013 (DE) .......................... 10 2013 003 795

(51) Int. Cl.
| | |
|---|---|
| B24B 51/00 | (2006.01) |
| B23F 19/00 | (2006.01) |
| B23F 1/02 | (2006.01) |
| B23F 17/00 | (2006.01) |
| B23Q 15/02 | (2006.01) |
| B23F 23/12 | (2006.01) |
| B23F 5/04 | (2006.01) |

(52) U.S. Cl.
CPC ... *B23F 1/02* (2013.01); *B23F 5/04* (2013.01); *B23F 17/001* (2013.01); *B23F 19/002* (2013.01); *B23F 23/1218* (2013.01); *B23Q 15/02* (2013.01)

(58) Field of Classification Search
CPC ..... B24B 51/00; B24B 53/035; B23F 19/002; B23F 19/00; B23F 1/02
USPC .......................................... 451/47, 5, 8, 9, 10
See application file for complete search history.

(56) References Cited

U.S. PATENT DOCUMENTS

| | | | | |
|---|---|---|---|---|
| 3,986,305 A | * | 10/1976 | Gunter .................. | B23F 19/002 451/47 |
| 2008/0113592 A1 | * | 5/2008 | Stadtfeld ............... | B23F 19/025 451/47 |
| 2013/0280990 A1 | * | 10/2013 | Geiser .................. | B23F 19/002 451/47 |

FOREIGN PATENT DOCUMENTS

| | | |
|---|---|---|
| DE | 3704607 A1 | 8/1988 |
| DE | 38 26 029 A1 | 2/1990 |

(Continued)

OTHER PUBLICATIONS

Stadtfeld, "Automated Closed Loop Manufactwing and Correction of Bevel Gear Sets," The Gleason Works, Rochester, New York, May 1, 1997, pp. 1-12.

*Primary Examiner* — Robert Rose
(74) *Attorney, Agent, or Firm* — Dilworth & Barrese, LLP

(57) ABSTRACT

The present invention relates to a method for hard-fine machining of tooth flanks with corrections and/or modifications on a gear-cutting machine, wherein respective toothed wheel pairings which mesh with one another within a transmission or a test device are machined while taking account of the respective mating flanks, and wherein the tooth flanks of the relevant workpieces are provided with periodic waviness corrections or waviness modifications. In accordance with the invention, the rotational error extent is determined by means of rotational distance error measurement of the toothed wheel pairs in a gear measuring device and/or transmission. This measurement result serves as an input value for defining the amplitude, frequency and phase position for the periodic flank waviness corrections on the tooth flanks of the toothed wheel pairings for production in the gear-cutting machine.

20 Claims, 2 Drawing Sheets

(56) References Cited

FOREIGN PATENT DOCUMENTS

| DE | 19517359 | C1 | 7/1996 |
| DE | 196 25 370 | C1 | 4/1997 |
| DE | 19706867 | A1 | 8/1998 |
| DE | 19719249 | C1 | 9/1998 |
| DE | 19907363 | A1 | 8/2000 |
| DE | 102004057596 | A1 | 11/2005 |
| DE | 102010026412 | A1 | 1/2012 |

* cited by examiner

MACHINING METHOD FOR HARD-FINE MACHINING OF NOISE-OPTIMIZED GEARS ON A GEAR-CUTTING MACHINE

BACKGROUND OF THE INVENTION

The invention relates to a method for gear grinding and/or gear honing of noise-optimized gears on a gear-cutting machine, to the associated measuring method and to the control software for the corresponding control of the gear-cutting machine.

The demands on modern transmissions with respect to construction size, noise behavior and transferrable powers are increasing more and more. The demands on the production precision of the installed gear wheels thus also increase inter alia. To satisfy these demands, the gear wheels are provided in many cases in manufacture with a targeted modified flank geometry which differs from the purely involute flank geometry. The modifications are designed in this respect such that they positively influence the running smoothness and the transfer behavior of the transmission under load pressure conditions.

The running noise of a transmission is determined at crucial points from the excitation or from the vibration behavior of the gear under the currently active load pressure conditions or from the time development of the tooth force in the respective tooth meshing. The vibration excitation of a spur gear pair under load and at sped represents an irregularity in the rotational movement between the pinion and the wheel. This irregularity can be described with reference to a variable path transmission, to the rotational distance difference or to the rotational distance error. The rotational distance difference or the rotational distance error is a function of the gear geometry and of the elastic behavior of the overall transmission system. The influence of the gear geometry on the excitation behavior is decisively determined by main geometrical characteristics such as the transverse contact ratio or the overlap ratio as well as by the shape of the tooth flank topology and by manufacturing tolerances.

It has now been recognized as the result of different research projects that, in addition to factors such as overlap ratio, pitch precision, tip reliefs and root reliefs at the gears, periodic corrections in the form of waviness on the flanks of a gear also have a positive influence on the noise excitation of a gear under load pressure conditions.

Calculation programs were prepared for this purpose in the different research projects with whose aid the influences of tooth modifications and tooth corrections on the running behavior and noise behavior of spur gear pairs were able to be simulated. In order now to carry out the calculation of a low-noise gear pair, a great deal of detail knowledge coupled with empirical investigations is required. The calculated results have to be converted into correction values and modification values or have to be implemented in a CNC machining program for the gear-cutting machine. The gear-cutting machine ultimately has to be capable of transferring these corrections very exactly onto the respective tooth flank.

As already previously described, in addition to macrogeometrical tooth flank corrections and tooth flank modifications in the range of several micrometers which primarily positively influence engagement shock and the disengagement shock of the gear mesh, microcorrections (flank waviness) on the tooth flanks are also necessary which have the result of a low-noise tooth meshing of the tooth pairs.

Gear-cutting machines with which corrections of the tooth flanks can be carried out are generally already known.

For instance, the method of profiling a worm grinding wheel with a three-dimensionally modified width zone is also described in addition to a grinding tool and the associated profiling tool in DE 10 2004 057 596, for example. The objective here is an increased degree of use of the worm grinding wheel width. Using a profiling gear in accordance with this description, 3-dimensional corrections on the tooth flanks are first able to be transferred to the worm grinding wheel and from there onto the ground workpiece again This type of profiling is, however, very inflexible since first a suitable 3-dimensionally corrected profiling gear has to be produced so that then its surface structure can in turn be transferred via the worm grinding wheel to the finished gear. Modifications to the profiling gear are very labor-intensive and can thus not be implemented in the short term in a mass-production process.

Documents DE 197 06 867 A1 and DE 37 04 607 each describe a method for the diagonal gear cutting of gears in order thus to produce corrections on the tooth flanks in dependence on the gear width. This is a tried and trusted method to directly produce or reduce interleaving on the flanks of a gear above all with spherical helical gears. For this purpose, the angle of engagement of the worm grinding wheel on the right/left worm flank is continuously varied from one end of the tool to the other and the tool is shifted in the axial direction of the tool during the grinding process in accordance with the workpiece width position. This process is, however, not sufficient alone directly to produce waviness on the tooth flanks of a ground gear. A surface modification of the dressing tool and/or of the worm grinding wheel over the tooth height is required for this purpose. Optionally, even additional axial movements of the gear-cutting machine are required.

DE 195 17 359 relates to the machining of a bevel gear pair, wherein one of the gear partners is ground and the other is honed to achieve a low-noise running noise in the transmission. This is already known in spur gear transmissions. The surface structure of a ground gear extends in the flank direction of the gear, that of a honed gear has a comma-shaped structure. These different directions of the surface structure on the tooth flanks have properties which are considerably smoother in running than two toothed wheels which were machined using the same hard-fine machining processes when they roll off one another. However, the combination of the two machining methods alone is not sufficient for the increased demands made today on the smooth running of a gear in a transmission. Still further measures rather additionally have to be taken.

A method of partial gear grinding of tooth flanks with periodic tooth flank modulation is described in DE 10 2010 026 412 A1. In this method, the tool is guided along the tooth flank in repeated stroke movements, with a delivery taking place in the normal direction between each stroke movement of the tool and the workpiece not carrying out any hob movement during the single stroke. The number of required stroke movements for machining an individual tooth flank and the associated high time effort per workpiece are disadvantageous in this method.

It is already known in this respect that the same waviness without phase shifts on the tooth flanks of the mutually meshing gears as a rule produces much lower noise excitations at all teeth on the rolling off add are thus less noise-critical than workpieces having complementary waviness.

It is furthermore known that an angle of rotation of the toothed wheel can be associated with each point on the tooth flank and characterizes its position on the rolling off. Conversely, the measurement of the angle of rotation or in this case the angle of rotation error can now be traced back to points on the tooth flanks. If therefore now the rotational distance error of the gear is recorded, regions result in which the angle of rotation is too small or too large with respect to the value which can theoretically be calculated, that is regions at which the rotational movement leads or lags. This irregularity of the rotational movement results in a vibration excitation of the transmission system.

SUMMARY OF THE INVENTION

The objective of the application is now to increase the uniformity of the rotational movement and thus to avoid or at least minimize the vibration excitation of the transmission.

A method should therefore be provided for producing a noise-optimized gear with tooth flank modifications in the form of waviness on the tooth flanks, wherein the amplitude, frequency and phase position of the waviness is determined from the measurement of the rotational distance error of the transmission and serves as the input value for the gear-cutting machine.

This object is achieved by a method of manufacturing a workpiece in accordance with the description herein. Further advantageous embodiments of the method are the subject of the description herein.

Care must therefore be taken in the regions in which the gear lags that a contact of the rolling partners on one another takes place earlier. More material must therefore be produced on the tooth flank in these regions, that is a waviness peak in the machining. Where the rotational movement leads, conversely, more material must now be removed in the hard-fine machining process. It therefore has to be taken into account in this respect that points such as the engagement shock or disengagement shock, change in the tooth force or the tooth deformation as well as the increase in overlap under pressure have to be considered to obtain a tooth mesh which is as uniform and as constant as possible or to achieve a rolling off of the rolling partners on one another, above all under pressure, which is as continuous as possible and thus to obtain a smooth-running gear.

For this purposes, the gears are measured while meshing under pressure meshing conditions on an external measuring device (measuring machine, transmission test bench, noise test bench, etc.) and the rotational distance error produced by the gears is recorded. This rotational distance error is transferred to the control software of the gear-cutting machine. Irregularities in the measurement results are smoothed via a compensation calculation and the result is converted into at least one periodic function for describing the required waviness in the profile direction and in the flank direction.

Using these functions (at least one per rolling partner), the control software of the gear-cutting machine now calculates waviness on the tooth flanks of the toothed wheel pairs involved in the meshing which result in a low-noise tooth meshing under the given meshing conditions and prepares a machining program therefrom with which the respective gears have to be hard-fine machined.

The machining program contains the machine movements required for generating this waviness and copies them, either on an associated dressing tool and/or as an instruction to move the machine axes in the machining of the workpiece.

The gears involved in the rolling off process then have to be machined accordingly using this machining program while taking account of the mesh conditions and of the gear ratio and have to be provided with the exactly mutually matching waviness on the tooth flanks in the hard-fine machining process.

Different machining processes can be used for generating the waviness. The simplest variant in this respect is to transfer the waviness directly to the hard-fine machining tool using the dressing tool and to machine the workpieces therewith. While taking account of the gear ratio, the waviness is then transmitted directly from the tool onto the toothed wheel flanks of the machined gear. This process cannot be used for unmodified tooth flanks or ones which have only been slightly modified.

If more complex flank modifications are required, other processes can be used such as a machining of the tooth flanks using a worm grinding wheel in which only certain regions are active above the tooth height, with the position of these regions varying over the tool width with respect to the tooth height. The tool is then used in a diagonal grinding process and thus generates a direct, low-noise profile modification in the form of microwaviness. The raised regions on the grinding tool are used at different flank positions by repeated shifting and re-engagement of the grinding tool and thus generate the required waviness on the tooth flanks.

A further possible method works with a direct generation of a wobble movement and/or an eccentricity of a used grinding tool or honing tool. It is also thereby achieved that a profile modification or profile waviness, in particular a defined periodic flank waviness, is generated on the active surface of the workpiece ground or honed with it.

An additional measuring device in the gear-cutting machine can verify the machining result independently and the result of the waviness can preferably be adapted even better to the desired final result in a subsequent optimization grind.

Since the machining is a mass production with a large batch size, these iteration steps are only necessary on a few workpieces at the start of the mass production until the desired result is achieved. The effort is therefore also worthwhile. In the following mass production, remeasuring to see whether the result still matches the requirements is possibly only performed after a dressing cycle or after a tool change.

The number and frequency of the measuring cycles depends on the demands on the finally machined workpiece. The tighter the tolerances and the higher the demands, the more frequently remeasurement and possible readjustment have to take place.

If the mass production run is then repeated, only slight modifications likewise have to be made since the base settings are stored together with the workpiece data by the machine control and thus remain available for the next run.

BRIEF DESCRIPTION OF THE DRAWINGS

Further details and advantages of the invention will be explained in more detail with reference to the embodiment shown in the drawings. There are shown:

FIGS. 2a, 2b 3-dimensional representation of a possibly tooth flank structure of a gear tooth.

DESCRIPTION OF THE PREFERRED EMBODIMENTS

Figure 1:
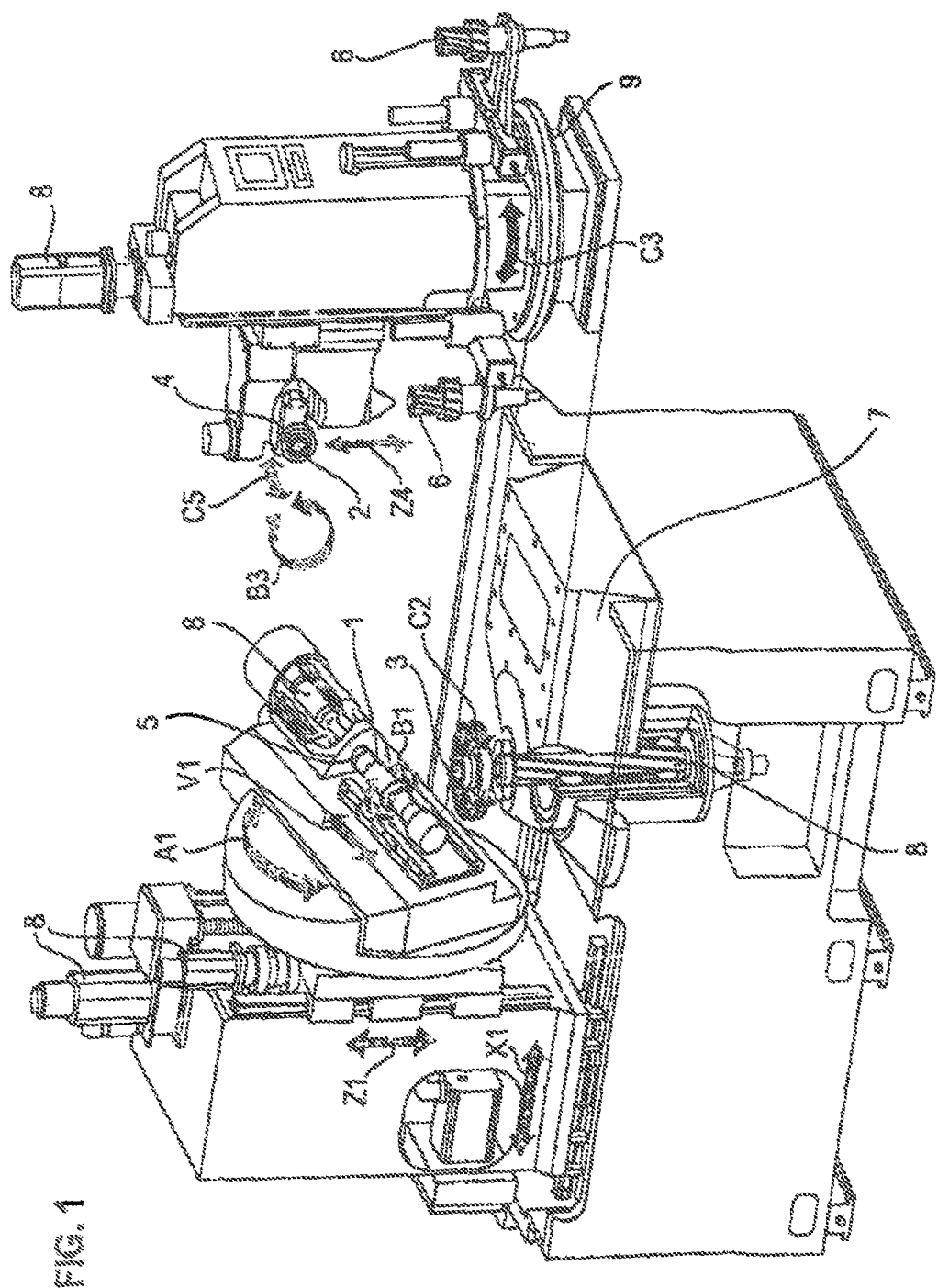
FIG. 1 a gear-grinding machine in accordance with the prior art.

FIG. 1 shows a perspective view of a gear-cutting machine, in particular of a gear grinding and profile grinding machine for carrying out the methods in accordance with the invention for manufacturing a profile modification or profile waviness, in particular a periodic flank waviness, on a workpiece to be gear cut. The gear cutting machine in this respect has the degrees of freedom required for the machining and can in particular carry out the drawn movements A1, B1, B3, C2, C3, C5, V1, X1, Z1 and Z4. In detail, XI describes the radial movement of the pedestal carriage; V1 the tangential movement or shift movement of the tool; Z1 the axial movement of the tool; B1 the rotational movement of the tool; C2 the rotational movement of the workpiece; A1 the pivot movement of the tool; Z4 the vertical movement of the counterholder; C3 the rotational movement of the ring charger; B3 the rotational movement of the dressing tool; and C5 the pivot angle of the dressing tool for varying the angle of engagement α at the grinding tool.

A possible measuring device for measuring the tooth flanks within the gear-cutting machine is not shown in this Figure, but could be arranged at the machining head 5 and could thus likewise also use the machine axis used in the machining process; they are in particular the axes Z1, V1, X1 and C2.

These axes Z1, V1, X1 and C2 as well as optionally A1 can likewise be used for generating the waviness on the tooth flanks if it is not already transferred to the grinding tool by a correspondingly profiled or dressed dressing tool. Alternatively, they can naturally also additionally be controlled in a targeted manner on the profiling or dressing of the machining tool.

Figure 2A:
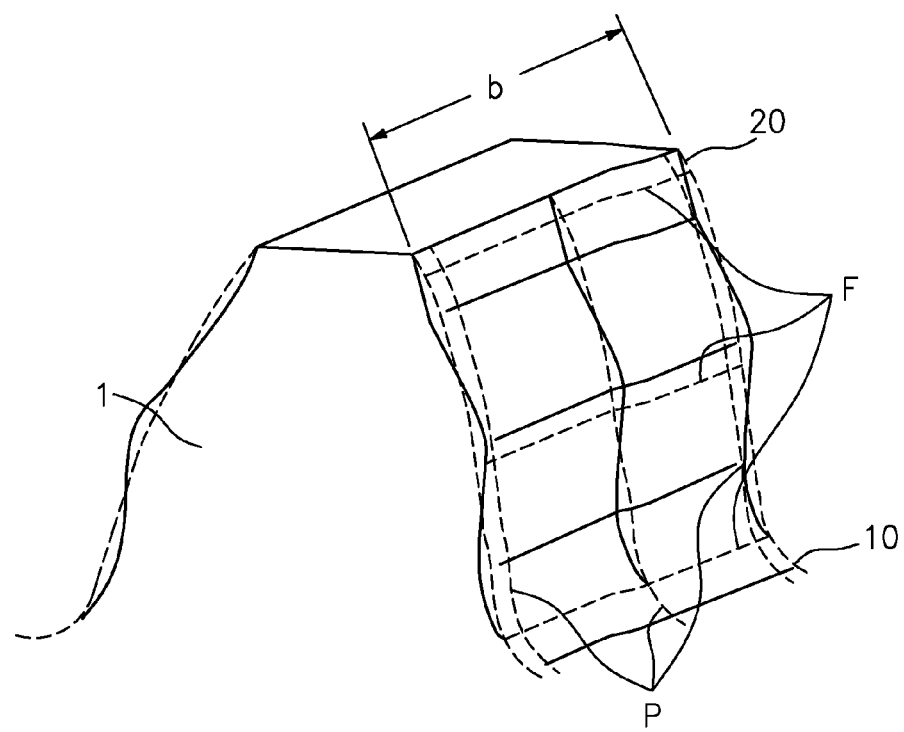
Figure 2B:
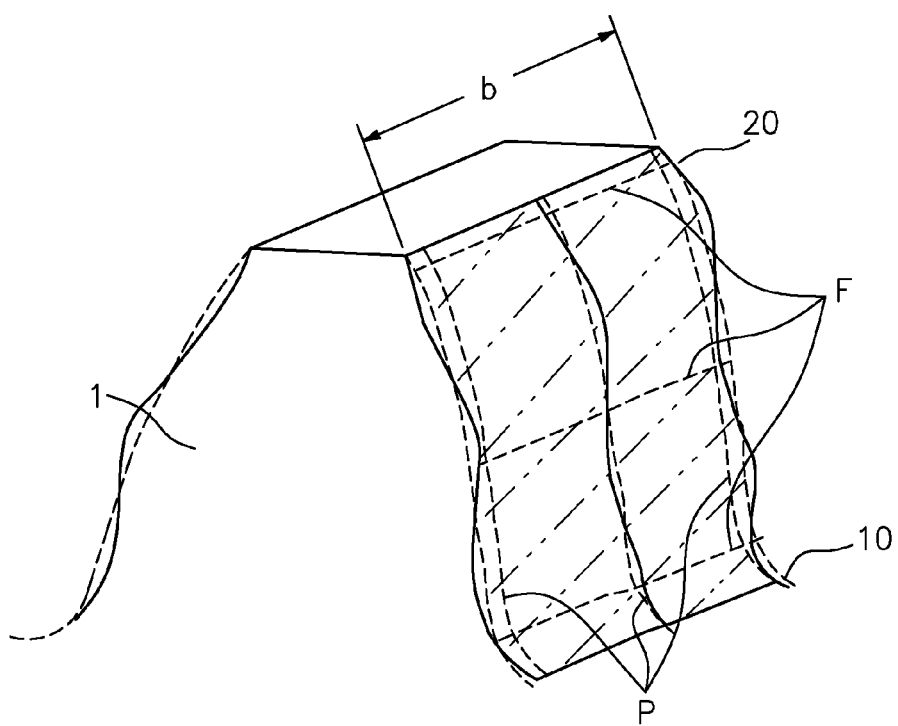

FIGS. 2a and 2b show a three-dimensional representation of a possible tooth flank structure of a single tooth 1 of a toothed wheel. The periodic structure parallel to the flank direction arises in a hard-fine machining process such as is used in accordance with the invention. The amplitude, frequency and phase position is determined by the gear-cutting machine software in accordance with the demands from the rotational distance error measurement.

In the representation, the amplitude development of the surface waviness of the tooth flank is shown with respect to an unmodified hard-fine machined gear without waviness (dashed line). For illustration, additionally further profile (P) lines and flank lines (F) are entered, with the profile lines (P) extending on each flank side from the tooth tip 20 up to the tooth root region 10. The flank lines (F) extend over the total tooth width (b), i.e. transversely to the alignment of the profile lines.

It can furthermore be seen from the Figures that the flank structure is constant in the transverse direction, i.e. over the total tooth width (b), that is has no waviness in this orientation. The wave propagation extends only from the tooth tip 20 to the tooth root 10.

The invention claimed is:

1. A method for hard-fine machining of tooth flanks with at least one of corrections and modifications on a gear-cutting machine, wherein
respective toothed wheel pairings which mesh with one another within a transmission or a test device are machined while taking account of the respective mating flanks,
the tooth flanks of the relevant workpieces are provided with periodic waviness corrections or waviness modifications,
a rotational error extent is determined by rotational distance error measurement of the toothed wheel pairs in at least one of a gear measuring device and transmission, and
this measurement result serves as an input value for defining the amplitude, frequency and phase position for the periodic flank waviness corrections on the tooth flanks of the toothed wheel pairings for production in the gear-cutting machine.

2. A method in accordance with claim 1, wherein the tooth flanks of a machined workpiece are measured by a measuring device and the gear is again subjected as required to a waviness correction or waviness modification while taking account of the obtained measurement result.

3. A method in accordance with claim 1, wherein the workpieces of a toothed wheel pair are machined after one another on the same gear-cutting machine.

4. A method in accordance with claim 1, wherein the workpieces of a toothed wheel pair are machined on a plurality of gear-cutting machines on which the machining programs can be swapped between one another.

5. A method in accordance with claim 1, wherein
the hard-fine machining tool is dressed and profiled by dressing processes, and
the dressing data for the tool are fixed by the gear-cutting machine in accordance with the required data for generating a periodic tooth flank modification on the finished workpiece.

6. A method of hard-fine machining a workpiece with at least one of a corrected gear geometry and a modified surface structure in accordance with claim 1, wherein a periodic flank waviness is generated on a respective at least one tooth flank of the workpieces by a hard-fine machining tool.

7. A method of hard-fine machining a workpiece with at least one of a corrected gear geometry and a modified surface structure in accordance with claim 1, wherein a periodic flank waviness is only generated on the teeth of a toothed wheel of a toothed wheel pair by a hard-fine machining tool.

8. A method of hard-fine machining a workpiece with at least one of a corrected gear geometry and a modified surface structure in accordance with claim 1, wherein a periodic flank waviness is produced at the first workpiece of the toothed wheel pair by a hard-fine machining tool to compensate the rotational distance error of the tooth meshing frequency.

9. A method of hard-fine machining a workpiece with at least one of a corrected gear geometry and a modified surface structure in accordance with claim 1, wherein a periodic flank waviness is produced at the second workpiece of the toothed wheel pair by a hard-fine machining tool to compensate the rotational distance error of a multiple of the tooth meshing frequency.

10. A method of hard-fine machining a workpiece with at least one of a corrected gear geometry and a modified surface structure in accordance with claim 1, using a computer program having an input takeover or data takeover for accepting the measurement values of an external measuring device and having a calculation function to generate machining programs using the external measurement values.

11. A method of hard-fine machining a workpiece with at least one of a corrected gear geometry and a modified surface structure in accordance with claim 10, using a computer program having a measurement function for checking the generated periodic waviness on the tooth flanks and having a correction function for correcting the machining program to minimize differences between the measured waviness and the achieved waviness.

12. A method in accordance with claim 4, wherein the hard-fine machining tool is dressed and profiled by dressing processes, the dressing data for the tool are fixed by the gear-cutting machine in accordance with the required data for generating a periodic tooth flank modification on the finished workpiece.

13. A method in accordance with claim 3, wherein the hard-fine machining tool is dressed and profiled by dressing processes, the dressing data for the tool are fixed by the gear-cutting machine in accordance with the required data for generating a periodic tooth flank modification on the finished workpiece.

14. A method in accordance with claim 2, wherein the hard-fine machining tool is dressed and profiled by dressing processes, the dressing data for the tool are fixed by the gear-cutting machine in accordance with the required data for generating a periodic tooth flank modification on the finished workpiece.

15. A method of hard-fine machining a workpiece with at least one of a corrected gear geometry and a modified surface structure in accordance with claim 14, wherein a periodic flank waviness is generated on a respective at least one tooth flank of the workpieces by a hard-fine machining tool.

16. A method of hard-fine machining a workpiece with at least one of a corrected gear geometry and a modified surface structure in accordance with claim 13, wherein a periodic flank waviness is generated on a respective at least one tooth flank of the workpieces by a hard-fine machining tool.

17. A method of hard-fine machining a workpiece with at least one of a corrected gear geometry and a modified surface structure in accordance with claim 12, wherein a periodic flank waviness is generated on a respective at least one tooth flank of the workpieces by a hard-fine machining tool.

18. A method of hard-fine machining a workpiece with at least one of a corrected gear geometry and a modified surface structure in accordance with claim 5, wherein a periodic flank waviness is generated on a respective at least one tooth flank of the workpieces by a hard-fine machining tool.

19. A method of hard-fine machining a workpiece with at least one of a corrected gear geometry and a modified surface structure in accordance with claim 4, wherein a periodic flank waviness is generated on a respective at least one tooth flank of the workpieces by a hard-fine machining tool.

20. A method of hard-fine machining a workpiece with at least one of a corrected gear geometry and a modified surface structure in accordance with claim 9, wherein twice the rotational distance error of the tooth meshing frequency is compensated.

* * * * *